(12) United States Patent
Byars et al.

(10) Patent No.: US 9,784,534 B2
(45) Date of Patent: Oct. 10, 2017

(54) MULTI-AIMING POINT RETICLE AND OPTICAL SCOPE INCORPORATING THE SAME

(71) Applicant: AIRTRONIC USA, LLC, Spring Branch, TX (US)

(72) Inventors: Mike Byars, Spring Branch, TX (US); Ryan Mezynski, Spring Branch, TX (US)

(73) Assignee: AIRTRONIC USA, LLC, Spring Branch, TX (US)

( * ) Notice: Subject to any disclaimer, the term of this patent is extended or adjusted under 35 U.S.C. 154(b) by 0 days.

(21) Appl. No.: 15/292,035

(22) Filed: Oct. 12, 2016

(65) Prior Publication Data

US 2017/0102209 A1 Apr. 13, 2017

Related U.S. Application Data

(60) Provisional application No. 62/240,398, filed on Oct. 12, 2015.

(51) Int. Cl.
| | |
|---|---|
| *F41G 1/38* | (2006.01) |
| *F41G 1/393* | (2006.01) |
| *F41G 1/473* | (2006.01) |
| *F41F 3/045* | (2006.01) |
| *G02B 27/32* | (2006.01) |

(52) U.S. Cl.
CPC ............. *F41G 1/393* (2013.01); *F41F 3/045* (2013.01); *F41G 1/473* (2013.01); *G02B 27/32* (2013.01)

(58) Field of Classification Search
CPC ....................................... F14G 1/473
USPC .................................... 42/122, 130
See application file for complete search history.

(56) References Cited

U.S. PATENT DOCUMENTS

| | | | | |
|---|---|---|---|---|
| 4,263,719 | A * | 4/1981 | Murdoch | F41G 1/12 33/277 |
| 8,910,412 | B2 * | 12/2014 | Mikroulis | F41G 1/473 42/122 |
| 9,068,799 | B1 * | 6/2015 | Wu | F41G 1/38 |
| 2009/0183417 | A1 * | 7/2009 | Smith, III | F41G 1/38 42/122 |
| 2013/0160346 | A1 * | 6/2013 | White | F41G 1/38 42/130 |
| 2015/0253132 | A1 * | 9/2015 | Senne | F41G 1/38 356/21 |
| 2016/0153749 | A1 * | 6/2016 | Sammut | F41G 1/38 42/122 |

* cited by examiner

*Primary Examiner* — J. Woodrow Eldred
(74) *Attorney, Agent, or Firm* — Polsinelli P.C.

(57) ABSTRACT

A multi-aiming point reticle for use in an optical scope is described including both range-finding and aiming points. The reticle, and scope incorporating the same, finds special utility for combination with a rocket propelled grenade (RPG) launcher to hit targets at extended distances. A method of operation is also described.

20 Claims, 6 Drawing Sheets

MULTI-AIMING POINT RETICLE AND OPTICAL SCOPE INCORPORATING THE SAME

CROSS-REFERENCE TO RELATED APPLICATION

This application claims benefit of U.S. provisional application Ser. No. 62/240,398, filed Oct. 12, 2015, and which is entirely incorporated by reference herein.

FIELD

The subject matter herein generally relates to optical scopes and reticles mounted therein and more specifically to reticles for a scope configured to be mounted to rocket propelled grenade (RPG) launchers.

BACKGROUND

Rocket propelled grenades (RPGs) and associated launchers have been known for decades. Generally, the RPGs have a limited effective range of up to 300 meters, and the RPG is configured to self-detonate at about 920 meters. The original RPG launchers had metallic sights, known as "iron sights" that limited the effective precision by which the grenade could be effectively aimed.

The Russians created optical sights for RPG launchers, and the optical sights were quickly copied by the Chinese. A Chinese optical sight is depicted in FIG. 1. Typical of both the Russian and Chinese designed optical sights was a reticle of the type illustrated in FIG. 2, except that the lowermost portion of the Chinese designed sights were reversed in orientation from the Russian designed sights. See FIG. 3. Use of the Chinese designed sight as a rangefinder is performed by aligning an object of known dimension, such as a soldier, between the curved and straight lowermost lines and reading the range from the scale above the curved line.

DETAILED DESCRIPTION

Figure 1:
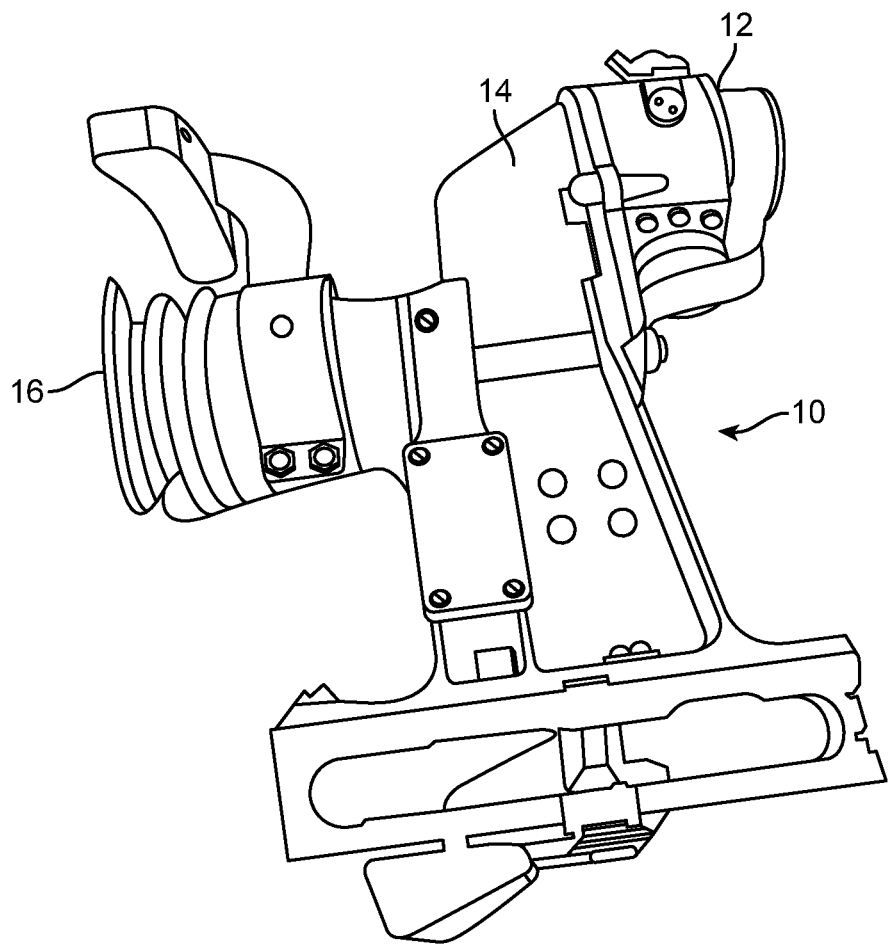
FIG. 1 illustrates a prior art Chinese designed optical sight for an RPG launcher.

It will be appreciated that for simplicity and clarity of illustration, where appropriate, reference numerals have been repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the examples described herein. The drawings are not necessarily to scale and the proportions of certain parts have been exaggerated to better illustrate details and features of the present disclosure.

Several definitions that apply throughout this disclosure will now be presented. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "about" signifies that the amount includes the specified amount, but can also include those values that are substantially close to the specified amount. Additionally by using both specified and about, the description can include just the values indicated in at least one example.

A reticle for an optical scope is provided that is useful for initially calibrating the scope to a fixed aiming point but also to act as a range-finding instrument and as a multi-point aiming device. The reticle can also be used to adjust for the movement of a moving target, to adjust for the presence of a cross-wind or a combination of both the movement of the target and the presence of the cross-wind.

The reticle can be etched into a transparent hard body, such as optical plastic or glass, and the reticle can be incorporated into an optical scope. In at least one example, the etched portions can be colored to provide for enhanced contrast with the surroundings. In at least one example, the reticle can be incorporated into an optical scope suited for used on a RPG launcher.

In one example, a multi-aiming point reticle comprises a fixed aiming point indicia. Additionally, the multi-aiming point reticle can comprise a vertical crosshair and a horizontal crosshair, each of the vertical and horizontal crosshair having an optical point of intersection; the point of intersection being below the fixed aiming point indicia; and a series of quadrilateral shapes between the fixed aiming point indicia and the point of intersection.

In at least one example, the reticle can include indicia of predetermined distance, such as mil marks, on the vertical and horizontal crosshairs.

In at least one example, the quadrilateral shapes in the first series of quadrilateral shapes are rectangles, but another series of quadrilateral shapes are provided which all differ in shape and size from the rectangles in the first series.

In at least one example, the reticle can be used for multi-point aiming up to distances of 900 meters, the currently effective range of modern rocket propelled grenades.

The present disclosure also includes a method of operating an RPG launcher to place RPGs on target at distances that are over twice the range of the current optical scopes. The range can be described as being as extreme since the present disclosure allows the RPG launcher to be used effectively to the end of the range of the RPG, which as indicated above generally detonates at about 920 meters.

FIG. 1 illustrates a Chinese designed optical sight 10 for an RPG launcher. The Chinese designed optical sight 10 is of the prism design where the light entering the objective lens 12 would be deflected by an internal prism (not visible) in the interior of part 14. An operator of the RPG launcher would see the light passing through a reticle (not visible in FIG. 1) through eyepiece 16.

Figure 2:
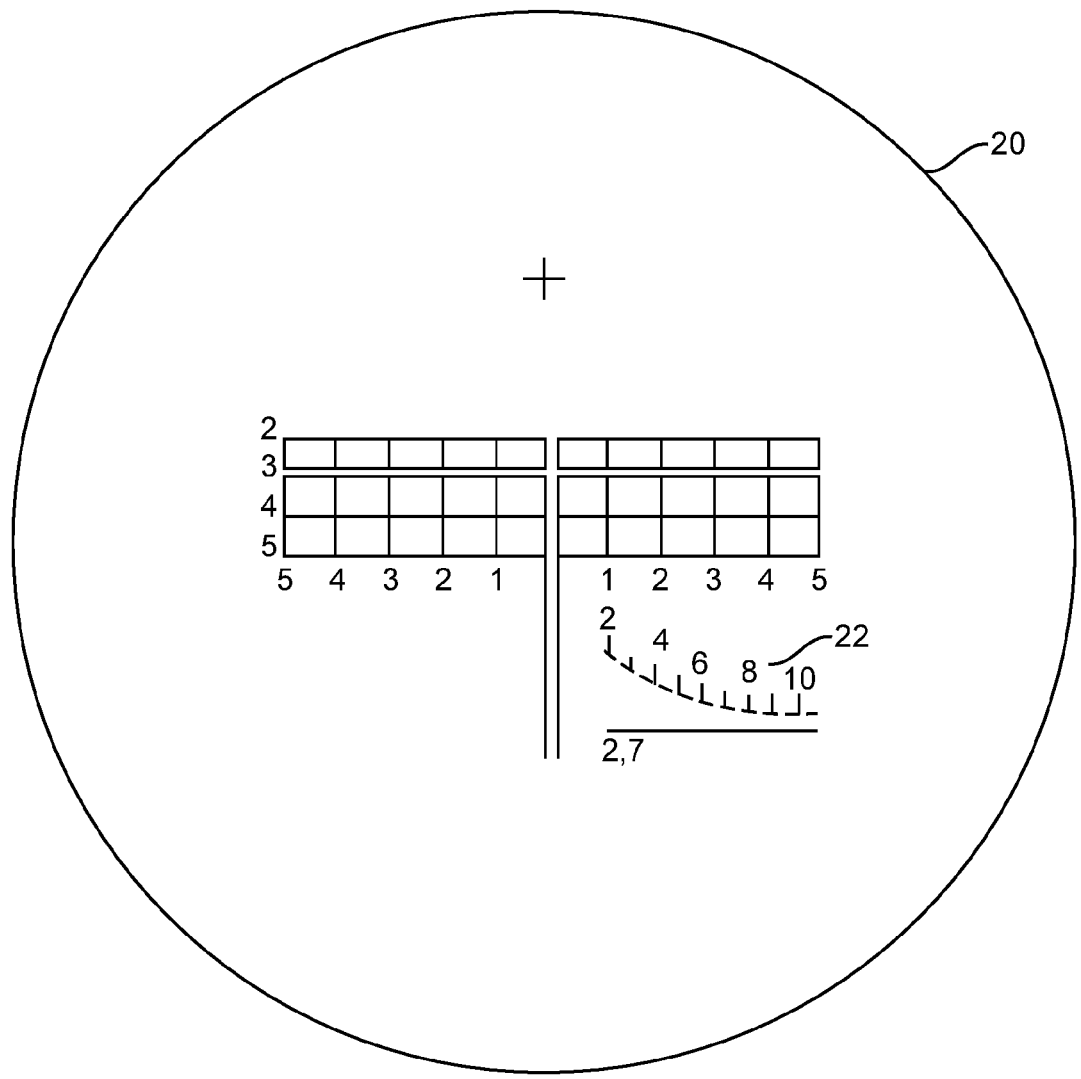
FIG. 2 is a schematic drawing of a prior art reticle for a Russian designed optical sight for an RPG launcher.

The reticle 20, shown in FIG. 2, is of the Russian designed optical sight. The Russian optical sight is the same as the Chinese one, except that the lowermost right-hand portion or rangefinder section 22 of the Russian designed reticle 20 is reversed in the Chinese designed reticle 32 shown in FIG. 3. The range-finding function of each of the Russian designed reticle 22 and the Chinese designed reticle 32 is analogous and only the use of the Chinese designed variant will be discussed in connection with FIG. 3.

Figure 3:
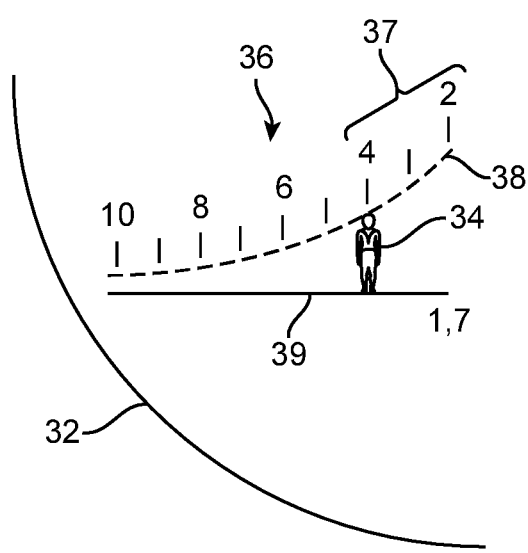
FIG. 3 is a schematic representation of an enlarged, lowermost left hand portion of a Chinese designed reticle for an optical sight for an RPG launcher.

As shown in FIG. 3, an object of known dimension, for example an upright soldier 34 is optically placed in the range-finding section 36 between a dashed curved line 38 and a straight line 39. The distance is read from the scale 37 above curved line 38. Intuitively, the further the target is from the reticle 32, the smaller it would appear. Scale 38 is marked with the appropriate conversion factor below line 39, in the case of the Chinese designed reticle 1.7 (1,7) and marked 2.7 (2,7) in the case of the Russian designed reticle 20 of FIG. 2. There are drawbacks to these types of range-finding scales. Thus, while an upright soldier presents a very small distance across his shoulders and therefore may be accurately centered at moderate ranges, the same is not true for a larger object, such as a Humvee or tank, or a target that is much further from the RPG launcher. It would therefore be more difficult to accurately place and center the target below the curved line bearing the appropriate indicia to determine the distance to target. Even a small error in placing the target in the range-finders of the Russian and Chinese designed reticles may result in misjudgment of the distance, resulting in off-target detonation of the RPG.

Additionally, the aiming points in each of the prior art designs of the Russian and Chinese designed reticles do not provide for accurate aiming of the RPG launcher at distances of 250-300 meters, even if the range to target is known. This is especially true if the target is moving, when there is a significant crosswind, or both. Further, if the target is not such that the known distance is essentially parallel with the reticle, the ability to measure the distance is greatly decreased.

While Russian and Chinese optical sights were moderately effective in open field warfare, where precise placement of the grenade was not required, modern urban warfare and the development of rocket propelled grenades of greater range reduces the effectiveness of the Russian and Chinese RPG sights. In order to place a RPG in a small target, for example, in foxhole or shell crater, or to land the RPG through a building window, more precise determination of distance to target is necessary in order to place the grenade on target. Small errors in accurately determining distance can make the difference between hitting the target and detonating a rocket propelled grenade ineffectively off target.

While a separate range-finding apparatus could be used to accurately determine distance, the limitations of the Russian and Chinese RPG optical sights could not utilize such information beyond about 300 meters. Additionally, the use of separate range-finding apparatus would require the use of a second man, or "spotter," to operate the range-finder and then to convey the range-finder's information to the operator, or "shooter," of the RPG. Not only could there be miscommunication between "spotter" and "shooter" but the conveyance of the information might give away their position. The operation of the separate range-finding apparatus by a single person would require shuttling back and forth between the range-finder and the RPG and would do little to improve the delivery of an on-target grenade, especially if the target was moving, and might also give away the shooter's position.

Figure 4:
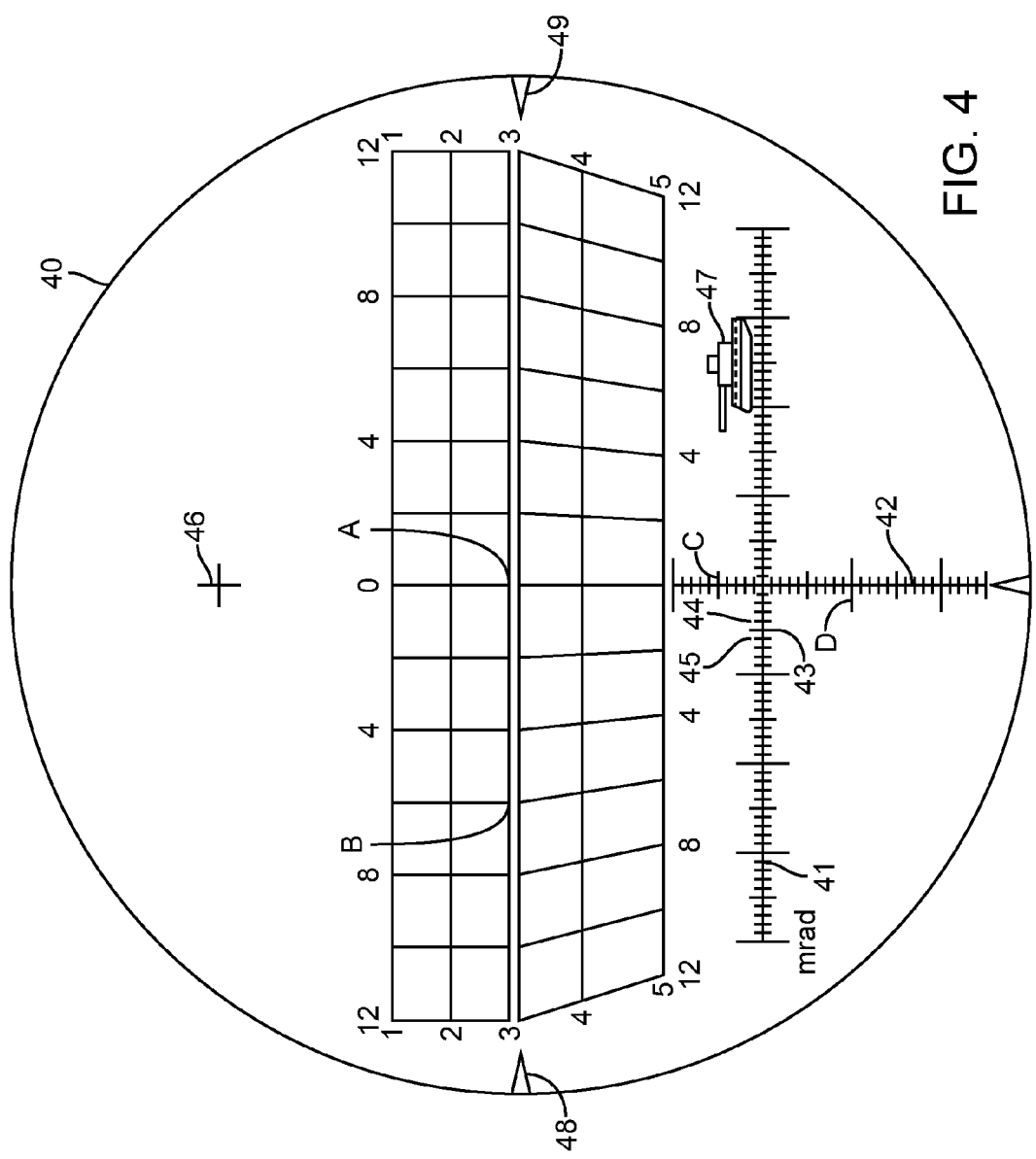
FIG. 4 is an illustration of the reticle of the present disclosure.

FIG. 4 illustrates an example of a reticle 40 according to the present disclosure. This reticle is an example only and some modifications are possible. As discussed below, specific scales are implemented thereon. The present disclosure covers scales that are different than the one illustrated herein. Some examples of these other scales are described below.

A fixed aiming point 46 is provided in reticle 40. This fixed aiming point 46 permits initial zeroing of the scope to place an RPG on target at a known distance, for example fifty meters. While the fixed aiming point 46 is illustrated as being set at fifty meters, the fixed aiming point 46 can be adjusted to reflect a desired standard. For example, the fixed aiming point 46 can be set to be at fifty yards, one hundred meters, or one hundred yards among other distances. Generally, RPGs do not have a symmetrical path of flight, such as a projectile fired from a rifle. In a rifle, the path of flight is symmetric rising from the bore of the barrel to its greatest height and then descending. An RPG on the other hand has a first path of flight from the muzzle of the RPG launcher due to propellant in the RPG that forces it from the muzzle and a second path of flight beginning when the rockets of the RPG ignite and provide lift some distance away from the muzzle. In one example, the RPG drops about one meter from the muzzle in the first ten to fifteen meters from the muzzle until the rocket provides lift. In other examples, different drops from the muzzle are also considered. The above example is considered to be a non-limiting example. In the case of a projectile from a rifle elevation from the muzzle is constant until the apogee of the projectile path is reached. Thus, the fixed aiming point 46 permits the RPG to hit a target at known distance, for example, fifty meters, even though the path of flight is asymmetric and is somewhat also dependent on ambient temperature, which ambient temperature can vary greatly (either hold or cold) from room temperature. While the example of fifty meters is mentioned herein, other examples can include any predetermined distance, for example fifty yards, one hundred meters, or one hundred yards.

The horizontal crosshair 41 and vertical crosshair 42 provide multiple functions in the reticle example. "Vertical" is used in the conventional dictionary sense of being perpendicular to the plane of the horizon or plumb. "Horizontal" is also used in the ordinary dictionary sense of being parallel to or in the plane of the horizon. However, in actual use, the reticle containing horizontal crosshair 41 and or vertical crosshair 42 may be canted from true vertical and true horizontal as conditions of use of the RPG require. Such canting will affect the path of flight and hence impact of the RPG and it is desirable to mount the optical scope, and maintain, as closely as practical, the orientation of the reticle in actual use, to the horizontal and vertical as can be maintained.

Gradations of known angular distance can be placed on each of crosshairs 41 and 42. The gradations can be uniformly spaced or of uniform and non-uniform spacing. In at least one example, some of the gradations can be omitted. In at least one example, the gradations are uniformly spaced. In one example, the gradations can be based on a mil scale. In other examples, the gradations can be on a Minute of Angle (MOA) scale. A "mil" is defined as a unit of angular measurement equal to the angle subtended by $1/6400$ of a circumference. A MOA is $1/60$ of a degree. Furthermore, other examples can include other known gradations such as millimeters or the like. In order to make the gradations easily cognizable every fifth gradation 43 is greater in degree than its adjacent gradations 44, 45. Although shown as hash marks, the gradations could be solid shapes, such as circular, rectangular, triangular or of other shape. Some shapes could be solid and others hollow or even differently colored. Use of these different gradations is illustrated in FIG. 4, where an object of known size, as illustrated a tank, fills some of the distance between gradations. The example of a tank is an example only and other known targets can be used. For example, the known target can be a wheel on a vehicle, a person, a car, a window, a door, a 55-gallon or other sized drum, an ordnance box, or other object in which the relative height or length is known. As either a mil or MOA is a known angular distance, counting the number of gradations filled and knowing the size of the object, distance to target can be readily calculated. While it is described as a target, the actual target could be something that is at substantially the same range or a short distance away. Using the known target, the distance to the target of interest can be estimated as well. While it can be a target of interest or other target that is close in distance, the remaining disclosure will refer simply to a target.

Once distance to target is known, the reticle of this example provides multiple aiming points. As shown in FIG. 4, indicia: 1, 2, 3, 4, 5 can be used to denote distance, in yards or meters, depending on the gradations employed in crosshairs 41, 42. Assuming the distance is in meters, one would place point A on a non-moving target, in the absence of a crosswind, at known range to target of 300 meters. If the target were moving to the left, and depending on the speed of the target, point B could be used as the aiming point. In such cases the shooter would place the target in the reticle 40 at point B and fire. Windage and elevation adjustments are compensated for by the reticle elements. Thus, there is no need to adjust the optical scope once the scope is zeroed at know distance utilizing fixed aiming point 46. Rather one would then utilize the design of the reticle to compensate both for distance (elevation) and windage (moving target and/or crosswind).

On the other hand, should the distance to target be 550 meters (with no movement of target or significant crosswind), the shooter would use point C as his aiming point. Thus, the shooter would use the vertical crosshair at point C on which to center the target. The vertical crosshair thus acts as an extended aiming point for distances to target of over 500 meters, as well as serving as a range-finder.

For example, if a target of known dimensions, such as a tank 47, is optically placed along the horizontal crosshair 41, its distance can be gauged by reference to the number of gradations that are spanned. Knowing the approximate length of the tank 47 and the gradation scale (for example, mil, MOA or other scale) the distance to the target can be calculated. Assuming the gradients are in mils and the distance to target tank 47 is 700 meters, the shooter would place the targeted tank (in the absence of movement or strong crosswind) at point D.

The reticle 40 can additionally be provided with a pair of horizontal indicia 48, 49 on an equator of the reticle 40 and a single vertical indicia 50 on the circumference of the reticle.

Figure 5:
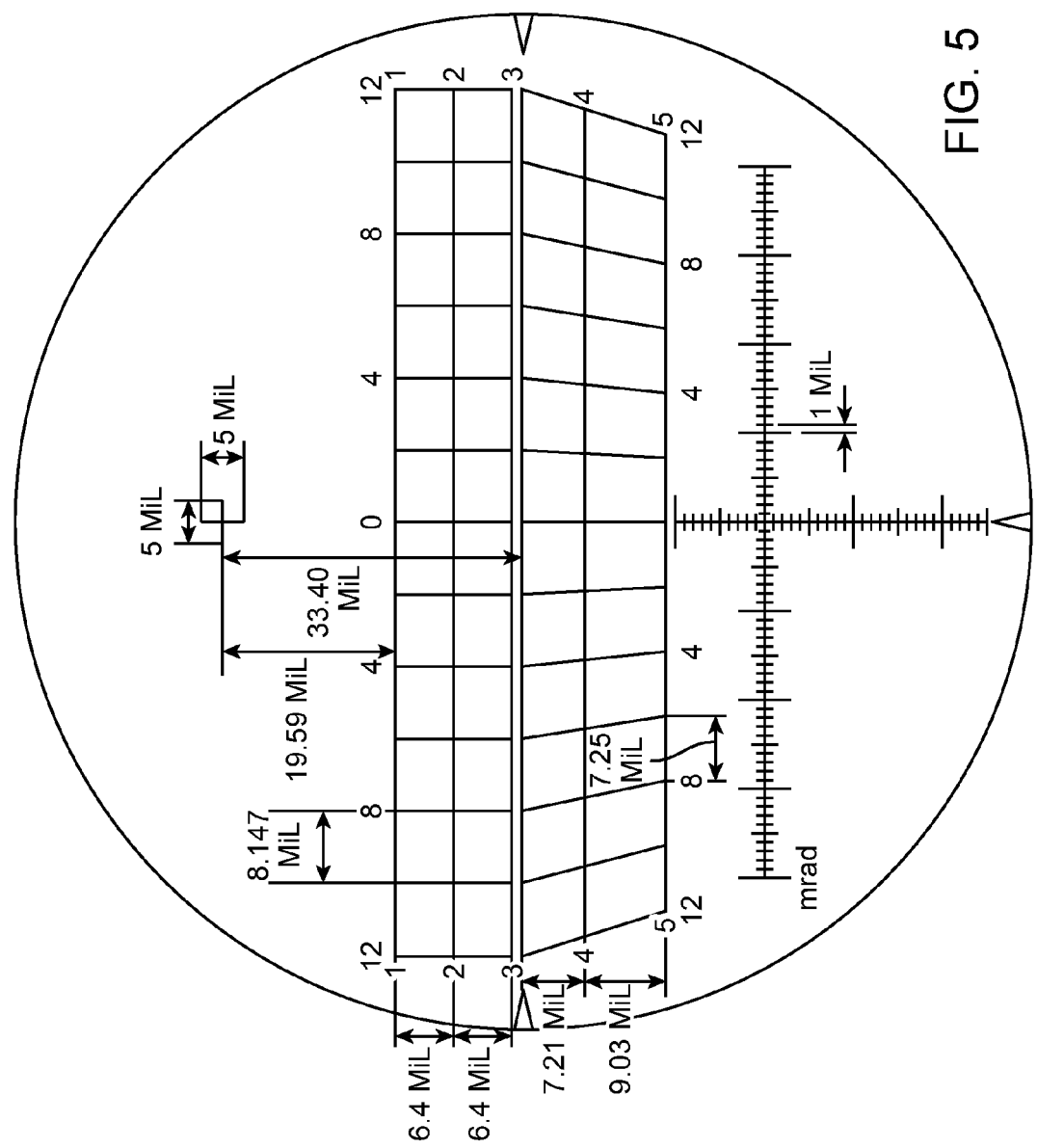
FIG. 5 is an illustration of the reticle of FIG. 4, with the dimensions of the reticle portions and relative distances between reticle portions provided.

FIG. 5 is an illustration of the reticle of FIG. 4, with the dimensions of the reticle portions and relative distances between reticle portions provided. As illustrated, the reticle includes a series of quadrilateral shapes between the fixed aiming point indicia and the point of intersection. As illustrated the series of quadrilateral shapes comprise a first set of quadrilateral shapes that are uniform in shape and size to each one in the series. In one example, the first set of quadrilateral shapes are rectangles. In other examples, the quadrilateral shapes can be squares. Additionally, in at least one example, the first set of rectangles comprise two rows. In at least one example, each of the rows are adjacent to one another and comprise a common horizontal side. In at least one example, the two rows can be arranged into a plurality of columns. Each of the rows can be adjacent to one another and the plurality columns can comprise common vertical sides between the two rows. While the first set has been generally described in relation to the rectangular shape illustrated, the present disclosure can include other shapes as mentioned above that would be considered within the scope of this disclosure.

Additionally as illustrated, the reticle can comprise a second set of quadrilateral shapes. In one example, the second set of quadrilateral shapes in the second set can be uniform in shape and size as compared to one another but different from the first set. In another example, the second set of quadrilateral shapes are identical to the first set. In yet another example, the second set of quadrilateral shapes can include two or more rows that have different sizes and shapes between the two rows. Furthermore, when the second set of quadrilateral shapes are provided in multiple columns, the size and shape of the quadrilateral shapes can vary. When the quadrilateral shapes are varying, the shape and size can vary to accommodate the change in lead and elevation that are required to hit a target at a distance. Examples are presented in FIG. 5.

Thus, in at least one example, the quadrilateral shapes in the second set can be non-uniform in shape and size to each quadrilateral shape in the first set. In at least one example, the second set of quadrilateral shapes can comprise two rows of quadrilateral shapes which are adjacent to one another and can comprise a common horizontal side. In still another example, the quadrilateral shapes in the second set can comprise two rows and multiple columns wherein only one vertical axis between columns is shared. In at least one example, the shared vertical axis can be aligned vertically with the vertical crosshair. In one or more example, all other shared sides of the quadrilateral shapes lie on non-vertical, non-horizontal axes. All the other shared sides of the quadrilateral shapes can be configured to slope towards the horizontal crosshair.

Figure 6:
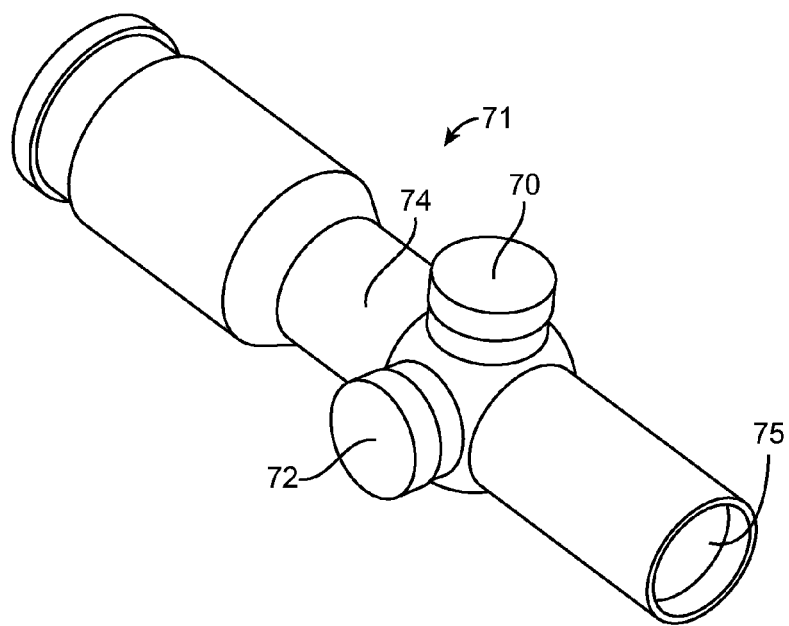
FIG. 6 is a perspective view of an optical scope incorporating the reticle of FIG. 4; and, FIG. 7 is a perspective view of the optical scope of FIG. 6 mounted on a RPG launcher.

FIG. 6 is a perspective view of an optical scope incorporating the reticle of FIG. 4. As illustrated in FIG. 6, optical scope 71 comprises an optical scope body 74, an objective lens 75, an elevation adjustment 70, and a windage adjustment 72. Elevation adjustments 70 and windage adjustments 72 permit zeroing of the RPG at the known distance and ambient temperature. In the Russian and Chinese prior art optical sights for the RPG launchers, there were separate temperature adjustments controls, but no elevation or windage adjustments. The elevation adjustment 70 of the present technology can also be implemented as a temperature adjustment. The elevation adjustment 70 can be set in a variety of different measurements. For example, the elevation adjustment 70 can be configured to provide for predetermined increments to allow accommodation for most standard temperature variations and other factors. In one example, the elevation adjustment 70 can be provided with 100 mil. In other examples, the elevation adjustment 70 can be provided with 100 MOA. Other adjustments can be in increments of, for example, 50, 60, 100, 110 or 120 of the relevant unit. Each of the units can be signified by a mark. In other implementations, each unit can be provided such that a click is provided. In other examples, both the marks and clicks can be implemented.

It should be understood by those skilled in the art that the reticle 40 is internal to the optical scope body 74. It is also within the purview of the examples to provide optical scope 71 with coatings on objective lens 75 to improve brightness of the scope, to filter undesired wavelengths of light and for other reasons known to the art. The optical scope 71 can be of fixed magnification power, or the optical scope 71 can a variable magnification power.

Figure 7:
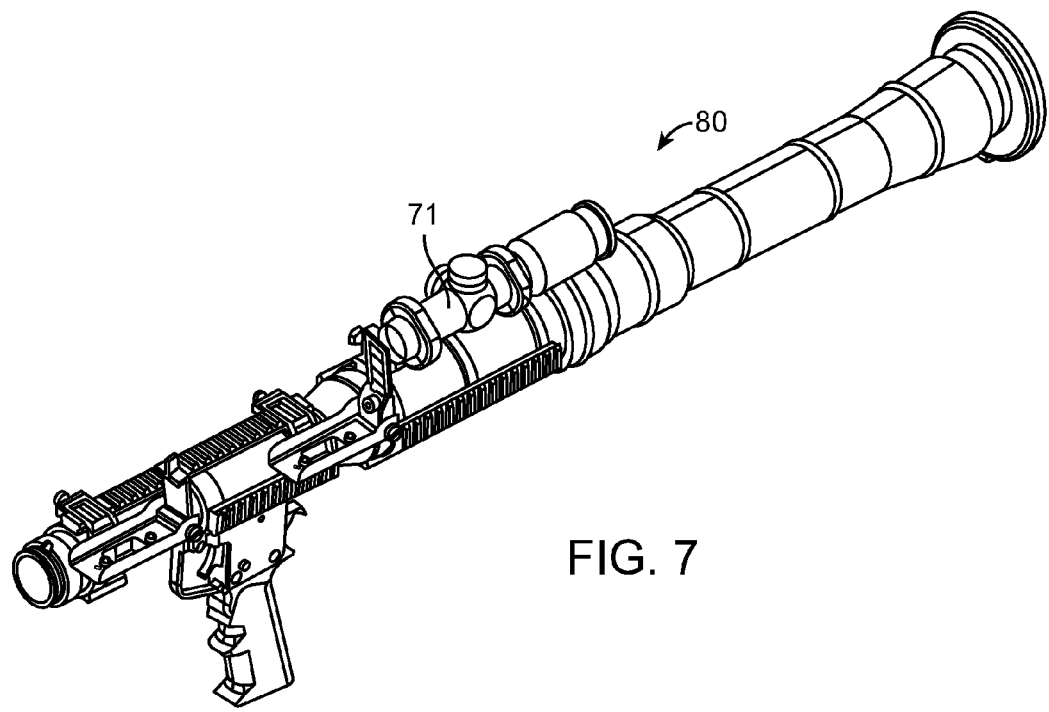

As shown in FIG. 7, in at least one example, an optical scope 71 can be mounted to or coupled with an RPG launcher 80 to aid in both range-finding targets and providing multiple aiming points without the need for a separate range-finding apparatus or the use of additional personnel (a "spotter") and reduces the movement required to both range-find and fire the RPG launcher 80 utilizing a single optical instrument, the optical scope 71.

The examples shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the examples described above may be modified within the scope of the appended claims.

What is claimed is:

1. A multi-aiming point reticle comprising:
    a fixed aiming point indicia;
    a vertical crosshair and a horizontal crosshair, each of the vertical and horizontal crosshair having an optical point of intersection; the point of intersection being below the fixed aiming point indicia;
    a series of quadrilateral shapes between the fixed aiming point indicia and the point of intersection.

2. The multi-aiming point reticle of claim 1, wherein the vertical crosshair comprises a series of predetermined distance gradients.

3. The multi-aiming point reticle of claim 2, wherein the vertical crosshair comprises a series of mil gradients and every fifth mil gradient is larger than its adjacent gradient.

4. The multi-aiming point reticle of claim 1, wherein the horizontal crosshair comprises a series of predetermined gradients.

5. The multi-aiming point reticle of claim 4, wherein the horizontal crosshair comprises a series of mil gradients and every fifth mil gradient is larger than its adjacent gradient.

6. The multi-aiming point reticle of claim 1, wherein the series of quadrilateral shapes comprise a first set of quadrilateral shapes that are uniform in shape and size to each one in the series.

7. The multi-aiming point reticle of claim 6, wherein the first set of quadrilateral shapes are rectangles.

8. The multi-aiming point reticle of claim 7, wherein the first set of rectangles form a row, wherein at least one intersection in the row is directly between the fixed aiming point indicia and the vertical crosshair.

9. The multi-aiming point reticle of claim 7, wherein the first set of rectangles comprise two rows and the rows are adjacent to one another and comprise a common horizontal side.

10. The multi-aiming point reticle of claim 7, further comprising a second set of quadrilateral shapes.

11. The multi-aiming point reticle of claim 10, wherein each of the quadrilateral shapes in the second set being non-uniform in shape and size to each rectangle in the first set.

12. The multi-aiming point reticle of claim 7, wherein the first set of rectangles comprise two rows and multiple columns and the rows are adjacent one another and the columns comprise common vertical sides between the two rows.

13. The multi-aiming point reticle of claim 12, wherein the quadrilateral shapes in the second set comprise two rows of quadrilateral shapes which are adjacent to one another and comprise a common horizontal side.

14. The multi-aiming point reticle of claim 12, wherein the quadrilateral shapes in the second set comprise two rows and multiple columns wherein only one vertical axis between columns is shared.

15. The multi-aiming point reticle of claim 14, wherein the shared vertical axis is aligned vertically with the vertical crosshair.

16. The multi-aiming point reticle of claim 15, further comprising a single vertical indicia on the circumference of the reticle.

17. The multi-aiming point reticle of claim 12, wherein all other shared sides of the quadrilateral shapes lie on non-vertical, non-horizontal axes.

18. The multi-aiming point reticle of claim 17, wherein all the other shared sides of the quadrilateral shapes slope towards the horizontal crosshair.

19. An optical scope incorporating the multi-aiming point reticle of claim 1.

20. A rocket propelled grenade (RPG) launcher in combination with the optical scope of claim 19.

* * * * *